UNITED STATES PATENT OFFICE.

SAMUEL R. MURRAY, OF INDIANAPOLIS, INDIANA.

COMPOSITION FOR PAVING AND OTHER PURPOSES.

1,327,726.  Specification of Letters Patent.  Patented Jan. 13, 1920.

No Drawing.  Application filed April 1, 1918.  Serial No. 225,696.

*To all whom it may concern:*

Be it known that I, SAMUEL R. MURRAY, a citizen of the United States, residing at Indianapolis, in the county of Marion and State of Indiana, have invented a new and useful Composition for Paving and other Purposes, of which the following is a specification.

The object of my invention is to produce a satisfactory paving or other composition from the ordinary earthy materials obtainable from existing dirt roads, and an asphaltic or bituminous cement.

In producing my paving composition, I take ordinary earth or clay from existing roadways, or any other source, and, first freeing the same, if necessary, from any considerable quantities of vegetable matter, break the same into fine particles, having at least 35 per cent. of sufficient fineness to pass through a 200-mesh sieve, and having no particles larger than ¼ inch. This earthy, or mineral, aggregate is either before or after breaking, placed in a suitable drier, or combined drier and mixer, where it is heated to a temperature of from 225 to 350 degrees Fahrenheit, the heat being maintained a sufficient time to drive off the moisture, whereupon, while still hot, there is added a sufficient quantity of bituminous, or asphaltic, cement to thoroughly coat each particle, but in no case should there be enough cement added at this stage of the process to produce such a surplus as would cause the particles to stick to the heater, or mixer, in the subsequent or final mixing process. In general, from 7 to 15 per cent. of a bituminous cement, soluble in carbon disulfid will be sufficient for this stage of the operation.

After the mixture, referred to above, has been thoroughly produced so that each particle will if possible, be coated with the cement, it is removed from the mixer and allowed to cool, preferably in layers which are not too thick to prevent ready breaking up when required for final breaking operation. The mixture which has just been described may be used, in its hot state, as a binder layer, in the usual manner, upon any suitable foundation.

In order to be prepared for use as a wearing surface, the mixture just described, after having cooled, is pulverized to such a degree of fineness that from 50 to 90 per cent. of the mixture will pass through a 200-mesh sieve and none of the particles be larger than $\frac{3}{16}$ inch in diameter. Thereupon, the pulverized material is heated in a suitable drier, or drier and mixer, to a temperature of from 250 to 350 degrees, whereupon hot bitumen, soluble in carbon disulfid, is added to produce a mixture of desired consistency. The percentage of added bitumen at this stage should range from 10 to 18 per cent., the precise amount being determined by the purpose for which the mixture is to be used and the degree of pulverization. The recommended penetration should range between 30 and 100 (Dow standard), allowance being made for some absorption of the lighter oils of the bitumen.

While a degree of pulverization which will produce at least 50 per cent. of particles which will pass through a 200-mesh sieve makes a satisfactory pavement, I prefer a higher degree of pulverization. After the second pulverization, heating and addition of bituminous cement, the mixture is deposited at the desired point, in heated condition, and compacted by any well known means and in the manner common in the production of sheet asphalt pavement.

I have found that by the process outlined above, I am able to produce an entirely satisfactory paving composition from clay and other earthy materials which have heretofore appeared to be unsatisfactory in the production of bituminous pavement.

I am aware that it has heretofore been proposed to mix pulverized earth with an asphaltic or bituminous cement and use the mixture for a paving composition, but such a mixture has been unsatisfactory, because it is apparently not possible practically to thoroughly coat all of the fine particles especially if the pulverization be carried to as high a degree as has been specified, but, instead, considerable quantities of uncoated particles will be produced in the mixture and, these, when subjected to wear, will break down and the pavement go to pieces. By allowing this preliminary mixture to cool and harden, and subjecting it to a second pulverization, reheating and remixture with additional cement, I find that not only are the larger particles broken up, and the pockets of uncoated pulverized material broken open and dissipated, but that the reheating operation apparently serves to insure a more uniform redistribution of the initial cement through the mass, so that the added hot cement is more uniformly distributed and as a consequence, a mixture is produced which possesses highly satisfactory and uniform wearing qualities.

I claim as my invention:

1. A composition composed of a repulverized mixture of pulverized earth and bituminous cement mixed with a further quantity of bituminous cement.

2. A composition consisting of a mixture of bituminous cement and a repulverized mixture of pulverized earthy materials and bituminous cement, repulverized to a degree producing at least 35 per cent. of particles which will pass through a 200-mesh sieve.

3. A composition consisting of a repulverized composition of earthy material, pulverized to produce at least 35 per cent. of particles capable of passing through a 200-mesh sieve, heated and mixed with sufficient bituminous cement to coat the particles; and a further quantity of bituminous cement.

4. A composition consisting of a composition of earthy material, pulverized to produce at least 35 per cent. of particles capable of passing through a 200-mesh sieve, heated and mixed with sufficient bituminous cement to coat the particles; cooled, repulverized to produce particles at least 50 per cent. of which will pass through a 200-mesh sieve, and a further quantity of bituminous cement.

5. The process of producing a composition which consists in pulverizing earthy materials to such an extent that at least 35 per cent. will pass through a 200-mesh sieve, heating the pulverized material, mixing therewith sufficient bituminous cement to lightly coat the particles, cooling the mixture, repulverizing the mixture to such an extent that at least 50 per cent. of the particles will pass through a 200-mesh sieve, heating the pulverized mixture and mixing therewith a further quantity of bituminous cement.

6. The process of producing a composition which consists in pulverizing earthy materials, heating the pulverized material, mixing therewith sufficient bituminous cement to lightly coat the particles, cooling the mixture, repulverizing the mixture, heating the pulverized mixture and mixing therewith a further quantity of bituminous cement.

In witness whereof I have hereunto set my hand at Indianapolis, Indiana, this 30th day of March, A. D. one thousand nine hundred and eighteen.

SAMUEL R. MURRAY.